United States Patent [19]

Derouineau

[11] 3,951,802

[45] Apr. 20, 1976

[54] WATER SOFTENER

[76] Inventor: René Derouineau, Moulin de Pélissey, B.P. N° 12, F - 33170 Gradignan, France

[22] Filed: May 30, 1974

[21] Appl. No.: 474,700

[30] Foreign Application Priority Data
May 30, 1973  France .................. 73.20649

[52] U.S. Cl. .................. 210/134; 210/191; 137/599.1
[51] Int. Cl.² .................. B01D 35/12; B01D 29/38
[58] Field of Search .................. 137/599.1, 625.29; 210/134, 136, 142, 190, 191

[56] References Cited
UNITED STATES PATENTS

| 2,217,692 | 10/1940 | McGill | 210/190 X |
| 3,079,949 | 3/1963 | Lundeen | 137/599.1 |
| 3,154,484 | 10/1964 | Stoner | 137/599.1 X |
| 3,216,450 | 11/1965 | Timmons | 137/599.1 |
| 3,392,835 | 7/1968 | Asper | 210/142 X |
| 3,487,936 | 1/1970 | Klein | 210/191 |
| 3,509,998 | 5/1970 | Pellett et al. | 210/191 X |
| 3,797,523 | 3/1974 | Brane et al. | 210/191 X |

Primary Examiner—Charles N. Hart
Assistant Examiner—Robert H. Spitzer
Attorney, Agent, or Firm—Irving M. Weiner; Pamela S. Burt

[57] ABSTRACT

A water softener has a salt container with an inlet duct which can be connected to a source of water to be softened, through a valve unit, and at least two outlet ducts each one of which is connected to the inlet duct of one of the softener containers through a one-way valve.

3 Claims, 3 Drawing Figures

WATER SOFTENER

This invention relates to a water softener and more particularly to a water softener which comprises at least two containers each one of which has an ion-exchange resin element as well as an inlet duct and an outlet duct, a supply duct connected to a source of water to be softened, a discharge duct for the softened water, a control valve for alternately connecting said containers to the supply duct and the discharge duct, a salt container, and a valve unit for passing a water stream through the salt container and alternately through that container which is not connected to said supply duct and said discharge duct.

It is known that drinking water contains elements which cause the so-called hardness of the water, said elements being mostly comprised of calcium and magnesium dissolved as bicarbonate and sulfate. To soften such water and thus do away with the drawbacks thereof, it is possible either to remove completely or partially the calcium or the magnesium, or to inhibit same by means of a complex-forming chemical.

Among the hard-water softeners, the most usual is the one that comprises a tank containing a bed of ion-exchange resins which have for property to fix the calcium and magnesium ions from the water to be treated and to substitute thereto sodium ions which always form soluble salts, a hopper for the salt required to regenerate said resins so as to remove the hardness retained in the pores thereof, and a control valve for controlling either the flow of hard water through the resins or the regenerating.

A water softener of the above-described type has been disclosed in U.S. Pat. No. 3,509,998. In said known softener, the salt container is connected during the resin-regenerating operation, to the outlet duct of that container the resin of which has to be regenerated and simultaneously to the softened-water discharge duct. Such an arrangement causes mixing of the brine contained in the salt container and of the softened water, in such a way that a large flow rate of diluted brine liquid has to pass through that container the resin of which is to be regenerated. To recover said liquid, it is necessary to provide a large-size salt container if a salt loss is to be avoided. Moreover, it is necessary with said known softener, to provide a volume proportioning of the brine, by means of a float arranged in the brine container and a valve controlling the return of the recovered liquid, which results in an intricate, costly construction which requires an accurate adjustment.

The present invention has for an object to provide a water softener which has a simple and inexpensive construction and which is reliable in operation without requiring an accurate or complex adjustment.

For this purpose the softener is characterized according to the invention by the salt container having an inlet duct which can be connected to said source of water to be softened, through said valve unit, and at least two outlet ducts each one of which is connected to the inlet duct of one of said containers through a one-way valve.

In an advantageous embodiment, the softener comprises a drain valve arranged between said outlet ducts of said containers and a drain duct, said drain valve can connect said drain duct to the outlet duct of that container which is undergoing said regenerating operation.

In another advantageous embodiment of the invention, the softener comprises a proportioning container having two chambers separated by a sliding piston, each container chamber being connected to the inlet duct of one of said containers through a connecting duct provided with a one-way valve, and each connecting duct is connected in that portion thereof lying between said proportioning container and said one-way valve, to the salt container inlet duct through a sealing valve.

Other details and features of the invention will stand out from the description given hereinbelow by way of non limitative example and with reference to the accompanying drawings, in which.

In the various figures, the same reference numerals pertain to similar elements.

Figure 1:
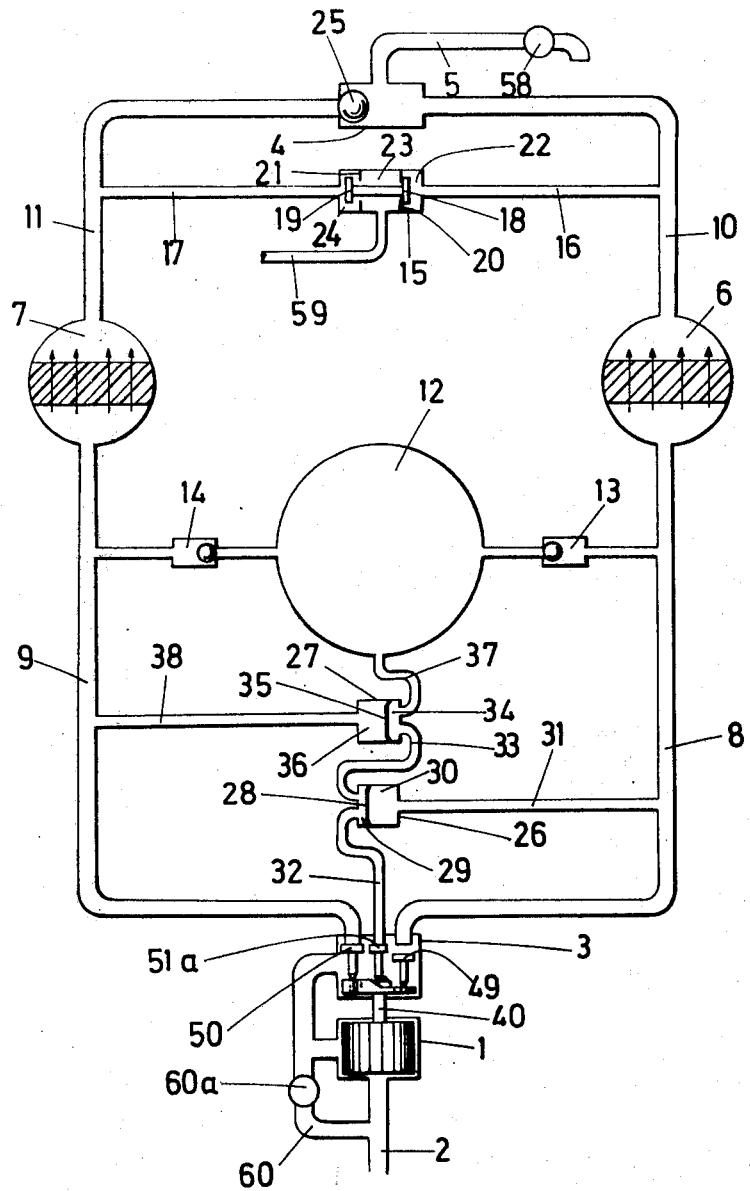
FIG. 1 is a diagrammatic view of one embodiment of the invention.
Figure 3:
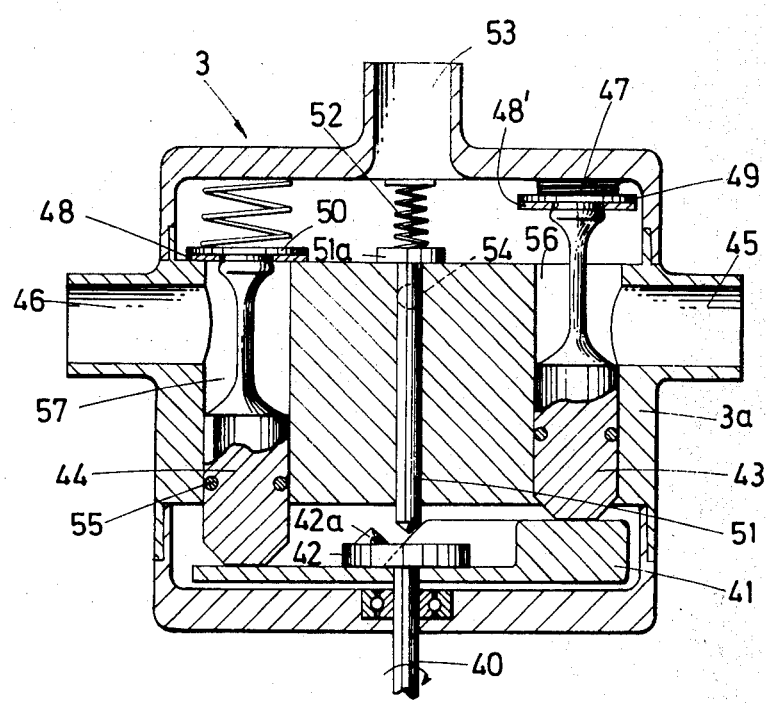
FIG. 3 is a section view through a control valve.

The softener shown in FIG. 1 comprises a hydraulic motor 1 of the volume-displacement type, to which hard water is supplied by a supply duct 2, said motor driving a control valve 3 the details of which are shown in FIG. 3. Between the control valve 3 and a three-way discharge valve 4 one way of which is connected to a drawing-off or discharge duct 5 for the softened water, are mounted in parallel two containers 6 and 7 that contain ion-exchange resins known per se. The connections between the valves 3 and 4 and the containers 6 and 7 are made respectively by means of inlet ducts 8,9 and outlet ducts 10,11.

Between the inlet ducts 8 and 9 is arranged a salt hopper 12 that supplies brine by the regenerating of the ion exchange resins. On either side of the salt hopper 12 is provided a one-way valve 13,14 which prevent the flow from the inlet ducts to the salt hopper 12.

Between the outlet ducts 10 and 11 and in parallel with the discharge valve 4 is arranged a drain valve 15 which is connected to the outlet ducts 10 and 11, respectively, by means of connecting ducts 16 and 17. Said drain valve 15 comprises a dual flap, the heads 18 and 19 of which can bear, respectively, against seats 20 and 21 which bound inside said valve three chambers 22 to 24.

As regards the discharge valve 4, said valve comprises a ball 25 used as a flap for connecting either duct 10 to discharge duct 5, or duct 11 to said discharge duct 5, but never duct 10 directly to duct 11.

The control valve 3 (FIG. 3) is operated by the hydraulic motor 1 by means of a shaft 40 which is integral with a rotating element in the shape of a disk or plate a portion of which is shaped as a cam 41, and with a circular plate provided with two cams 42a which lie diametrically opposite one another but with an angular displacement relative to cam 41. Inside a body 3a of valve 3 are provided bores 56 and 57 inside which slide pistons 43 and 44 which are each provided with an O-ring 55, bore 56 being connected to the inlet duct 8 by means of a fitting 45 while bore 57 is connected to the inlet duct 9 by means of a fitting 46. The cam 41 can raise in sequence the pistons 43 and 44 which are moved against the action of a spring 47 bearing on the head 49,50 thereof forming supply valves which are provided with gaskets 48 and 48'. The cams 42a can raise a piston 51 the head 51a of which bears on a spring 52, said head forming a valve for controlling a resin-regenerating operation.

The salt hopper 12 is connected to the control valve 3 through two regenerating valves 26 and 27 which are series-connected and of a type with a flexible and distortable diaphragm. The valve 26 comprises a diaphragm 28 which bounds two chambers 29 and 30, chamber 30 being connected to duct 8 through a connecting duct 31, while inside chamber 29 open two ducts 32 and 33 which connect respectively said valve 26 to the control valve 3 and to chamber 34 of the valve 27. Said valve 27 comprises a flexible and distortable diaphragm 35 which bounds two chambers 34 and 36 inside which open respectively, a duct 37 connected to the salt hopper 12 and a duct 38 connected to duct 9.

The valves 26 and 27 are series-connected in the inlet duct 37 of the salt hopper 12 so as to allow preventing a too large brine flow when flap 51a controlling the regenerating operation lies in the opening position when stopping the drawing-off.

The operation of such a softener is as follows:

When a cock 58 arranged in the discharge duct 5 is opened, the motor 1 is driven and operates in turn the control valve 3. According to the position of cam 41, one of the inlet ducts 8 or 9 is supplied with hard water from duct 60 connected to hydraulic motor 1. If it is assumed that duct 8 is supplied with hard water, said water passes directly into container 6 because the one-way valve 13 prevents said water flowing towards the salt hopper 12. The softened water as it passes through container 6, flows through discharge valve 4 of outlet duct 10 to the discharge duct 5 and consequently through cock 58, as the pressure inside duct 16 and chamber 22 causes the head 18 of the double flap to bear against the seat 20 thereof thus cutting off the communication between the duct 16 and the drain duct 59.

At some given time for a suitable position of the cams 41 and 42a, the duct 8 and the duct 32 which opens in the control valve 3 flush with a port 54, are simultaneously supplied with hard water. Consequently, the hard water entering with the same pressure the chambers 29 and 30 of valve 26 balances the diaphragm 28 which thus comes back to the stable balanced position thereof which allows the hard water to flow to valve 27. As on the other hand the pressure inside duct 38 is zero, the water flows through the valve 27 to reach the salt hopper 12 from which the water comes out again loaded with brine to flow through the flap 14 which has moved away from the seat thereof, towards the container 7 inside which regenerating of the ion-exchange resins will be performed, the discharge of said washing water being drained through the drain valve 15 because the head 19 of the double flap has moved away from the seat 21 thereof due to the pressure inside chamber 22 which allows the communication between the duct 17, the chambers 24 and 23 and the drain duct 59.

The starting portion of the supply to the duct is used to rinse the ion-exchange resins to remove the remaining brine therefrom. Indeed as long as the lower end of piston has not reached the top of cam 41, the head 19 of the double flap does not yet bear against the seat 21 thereof, which thus allows to drain the water for rinsing away the remaining brine.

As soon as this cycle has ended, the cycle corresponding to container 7 begins with first the supply of duct 9 only due to the raising of piston 44 by means of cam 41. Thereafter, the simultaneous supply to ducts 9 and 32 occurs so as to allow as before to regenerate the ion-exchange resins inside container 6, the supply to duct 32 being made as soon as the other cam 42a releases the supply to port 54.

A branch duct 60 is arranged in parallel relationship with the hydraulic motor. Said duct 60 and a cock 60a arranged thereon allow to change the rotating speed of hydraulic motor 1 and consequently to adjust the duration of the succeeding supply phases of both containers 6 and 7.

Figure 2:
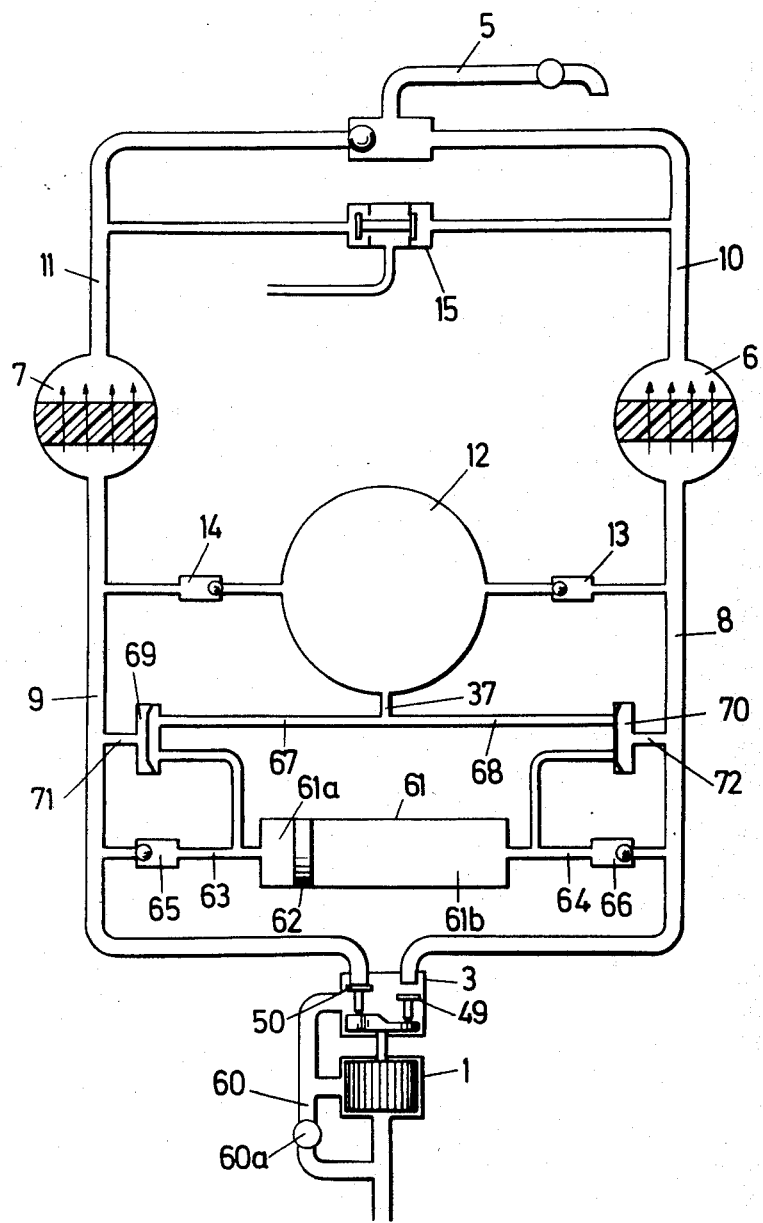
FIG. 2 is a view similar to FIG. 1 but showing another embodiment of the invention.

The softener shown in FIG. 2 differs from the softener described above in the design of the means for controlling the regenerating operation. Said softener comprises a proportioning container 61 which is divided into two chambers 61a and 61b by a sliding piston 62. Each chamber 61a and 61b is connected to one of the inlet ducts 8 and 9 respectively, through connecting ducts 63 and 64, each one of said ducts 63 and 64 being provided with a one-way ball valve 65 and 66 respectively. The inlet duct 37 of the salt container is connected to the proportioning container 61 through connecting ducts 67 and 68 which join ducts 63 and 64 respectively, between the one-way valves 65 and 66 and the proportioning container 61. Each duct 67 and 68 is provided with a sealing-off flap 69 and 70 of the type having a flexible distortable diaphragm. Each sealing-off flap 69 and 70 is connected to the corresponding inlet duct 8 and 9 through control ducts 71 and 72 respectively.

The operation of the softener shown in FIG. 2 is as follows:

In the position of valve 3 shown in FIG. 2, the water to be softened flows through container 6, the water pressure causing the closing of flap 70 and the opening of the one-way valve 66. The chamber 61b is filled progressively and the piston 62 when it moves, forces the water contained inside chamber 61a through duct 67 into the salt container 12, the sealing-off flap 69 being opened by the action of the water pressure present inside the duct 67. The regenerating operation is ended when the piston 62 has reached one end position thereof. A similar regenerating operation occurs in the circuit of container 6 when the valve 49 closes and the valve 50 opens.

It must be understood that the invention is in no way limited to the above embodiments and that many changes can be brought therein without departing from the scope of the invention as defined by the appended claims.

I claim:

1. A water softener comprising:
first and second containers;
an ion-exchange resin element in each of said containers;
an inlet duct and an outlet duct for each of said ion-exchange containers;
a hard water supply duct;
a soft water outlet;
a salt container;
pipe circuitry connected to said salt container and alternately to each said ion-exchange container for alternately regenerating one said container when the other said container is connected to said hard water supply duct;
a control valve connected in the path between said hard water supply duct and said inlet ducts of said first and second ion-exchange containers;
said control valve being automatically actuated by hard water from said hard water supply duct to alternately supply hard water to each of said ion-exchange containters;

drive means for said control valve;

a positive-displacement hydraulic motor connected to said hard water supply duct for rotating said control valve drive means when water flows from said hard water supply duct in the direction of either one of said ion-exchange containers;

said control valve operating to provide a liquid connection between said hard water supply duct and either said inlet duct of said first ion-exchange container or said inlet duct of said second ion-exchange container in accordance with the momentary position of said drive means;

a discharge valve having two inlet ports, each one of which is connected to the outlet duct of one of said ion-exchange containers, an outlet port to which is connected said soft water outlet, and valve means constructed and arranged to make a liquid connection between said soft water outlet and the outlet duct of that ion-exchange container which is connected to said hard water supply duct through said control valve;

means to deliver a predetermined quantity of hard water to said salt containers;

a pair of brine outlet ducts each extending between said salt container and said inlet duct of each ion-exchange container, respectively;

a one-way valve being mounted in each of said brine outlet ducts to cut-off the connection of pressure being present in the ion-exchange container inlet duct when the ion-exchange container is connected to said hard water supply duct through said control valve;

a drain valve to drain said brine;

said control valve includes a first piston constructed and arranged to slidably connect and disconnect said hard water supply duct to and from said inlet duct of said first ion-exchange container, respectively;

said control valve includes a second piston constructed and arranged to slidably connect and disconnect said hard water supply duct to and from said inlet duct of said second ion-exchange container, respectively;

said control valve including a cam which is rotated by said control valve drive means for ultimately actuating said first and second pistons; and wherein on operation of said control valve to change the connection between said hard water supply duct and said inlet duct of either of said ion-exchange containers, both ion-exchange container inlet ducts are simultaneously in liquid connection with said hard water supply duct.

2. A water softener according to claim 1, wherein:

said drain valve includes a valve body having two inlet ports, a drain outlet, a pair of seats arranged in said body between each of said drain inlet ports and said outlet, and a pair of interconnected pressure-operated valve members;

said drain inlet ports each being connected to one of said outlet ducts of said ion-exchange containers, respectively; and wherein on pressure being present in one of said drain inlet ports connected to one of said ion-exchange containers the inlet duct of which is in liquid connection with said hard water supply duct through said control valve, liquid connection is established between the other of said drain inlet ports and said drain outlet.

3. A water softener according to claim 1, wherein said means for delivering a predetermined quantity of hard water to said salt container comprises:

a proportioning container having a first chamber of variable volume and a second chamber of variable volume;

a first non-return valve connected between said first chamber of variable volume and said inlet duct of said first ion-exchange container;

a second non-return valve connected between said second chamber of variable volume and said inlet duct of said second ion-exchange container;

a first pressure-operated sealing valve connected between said first chamber of variable volume and said salt container;

a second pressure-operated sealing valve connected between said second chamber of variable volume and said salt container;

a first control duct connected between said first pressure-operated sealing valve and said inlet duct of said first ion-exchange container;

a second control duct connected between said second pressure-operated sealing valve and said inlet duct of said second ion-exchange container;

each said non-return valve establishing liquid connection with its associated inlet duct of its associated ion-exchange container only when pressure is present in such inlet duct; and wherein each said sealing valve cuts-off the connection between its associated chamber of variable volume and said salt container when pressure is present in its associated ion-exchange container inlet duct in response to said ion-exchange having its inlet duct in liquid connection with said hard watter supply duct through said control valve.

* * * * *